(12) United States Patent
Kim et al.

(10) Patent No.: US 11,941,435 B2
(45) Date of Patent: Mar. 26, 2024

(54) ELECTRONIC DEVICE FOR RAPID ENTRY INTO APPLICATION BEING RUN, METHOD OF OPERATING THE SAME, AND STORAGE MEDIUM

(71) Applicant: Samsung Electronics Co., Ltd., Gyeonggi-do (KR)

(72) Inventors: Kiljae Kim, Gyeonggi-do (KR); Byungsoo Kwon, Gyeonggi-do (KR); Younghun Kim, Gyeonggi-do (KR); Jaeho Kim, Gyeonggi-do (KR); Hyunchul Seok, Gyeonggi-do (KR); Daehyun Cho, Gyeonggi-do (KR); Wonseo Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 465 days.

(21) Appl. No.: 17/168,463

(22) Filed: Feb. 5, 2021

(65) Prior Publication Data
US 2021/0248004 A1    Aug. 12, 2021

(30) Foreign Application Priority Data
Feb. 7, 2020    (KR) .................. 10-2020-0015196

(51) Int. Cl.
*G06F 9/48*    (2006.01)
(52) U.S. Cl.
CPC ................. *G06F 9/4881* (2013.01)
(58) Field of Classification Search
CPC .................................................. G06F 9/4881
See application file for complete search history.

(56) References Cited

U.S. PATENT DOCUMENTS

| 2009/0254915 | A1  | 10/2009 | Stubbs et al. |
| 2010/0299671 | A1  | 11/2010 | Kinsey |
| 2012/0084792 | A1* | 4/2012  | Benedek ............... G06F 9/544 |
|              |     |         | 719/313 |

(Continued)

FOREIGN PATENT DOCUMENTS

| JP | 2019-125242 | 7/2019 |
| KR | 1020040101094 | 12/2004 |
| WO | WO2019072200 | 4/2019 |

OTHER PUBLICATIONS

Of Wu et al. ("Research on Improving Fairness of Linux Scheduler", Proceeding of the IEEE International Conference on Information and Automation, Yinchuan, China, Aug. 2013). (Year: 2013).*

(Continued)

*Primary Examiner* — Wissam Rashid
(74) *Attorney, Agent, or Firm* — The Farrell Law Firm, P.C.

(57) ABSTRACT

Disclosed is an electronic device including at least one processor, and a memory operatively coupled to the at least one processor. The memory stores instructions configured to enable the at least one processor to identify, in response to running of an application, a plurality of tasks related to a running operation of the application, allocate virtual runtimes to the plurality of tasks when scheduling, adjust the virtual runtime of at least one task to be run with priority among the plurality of tasks to be a minimum value, arrange the at least one task with the adjusted virtual runtime, and run the at least one task with priority according to an arrangement order.

18 Claims, 12 Drawing Sheets

(56) References Cited

U.S. PATENT DOCUMENTS

| | | | |
|---|---|---|---|
| 2012/0159497 A1* | 6/2012 | Lim | G06F 9/4881 |
| | | | 718/102 |
| 2014/0137184 A1* | 5/2014 | Russello | G06F 21/60 |
| | | | 726/1 |
| 2014/0359632 A1 | 12/2014 | Kishan et al. | |
| 2015/0113540 A1* | 4/2015 | Rabinovici | G06F 9/5011 |
| | | | 718/104 |
| 2020/0241917 A1 | 7/2020 | Chen et al. | |
| 2022/0035670 A1 | 2/2022 | Ugalde Diaz et al. | |

OTHER PUBLICATIONS

Patil et al. (A Survey of Fairness and Performance Analysis of Completely Fair Scheduler in Linux Kernel, International Journal of Control Theory and Applications, vol. 9, No. 44, 2016): Analyses the CFS with earlier Lynux schedulers and explains the Red Black Tree algorithm in relation to CFS. (Year: 2016).*

International Search Report dated May 21, 2021 issued in counterpart application No. PCT/KR2021/001469, 7 pages.

* cited by examiner

| APP List | Entry time in load-free case ||| Entry time in 50% load case |||
|---|---|---|---|---|---|---|
| | Base(ms) | FTT applied(ms) | Percentage increase | Base(ms) | FTT applied(ms) | Percentage increase |
| Traffic Rider | 265.7 | 250.7 | -5.65% | 283.3 | 263.3 | -7.06% |
| Asphalt8 | 499.4 | 494.4 | -1.00% | 637.1 | 616.2 | -3.28% |
| Slither | 692.4 | 695.2 | 0.40% | 832.6 | 811.5 | -2.53% |
| Angry Birds | 431.4 | 430.6 | -0.19% | 556.7 | 523.3 | -6.00% |
| Riodicalc | 345.1 | 338.3 | -1.97% | 426.4 | 407.1 | -4.53% |
| Polaris | 348.7 | 328.7 | -5.74% | 429 | 415.4 | -3.17% |
| Helloworld | 105.6 | 103.2 | -2.27% | 132.8 | 119.3 | -10.17% |
| Homeworkout | 315.7 | 312.8 | -0.92% | 368.6 | 370.7 | 0.57% |
| Chopin | 319.1 | 316.8 | -0.72% | 416.7 | 405.7 | -2.64% |
| Adobe | 281.4 | 274.6 | -2.42% | 332.5 | 341.9 | 2.83% |
| Weibo | 339.5 | 329.4 | -2.97% | 433.1 | 409.9 | -5.36% |
| Sum | 3944 | 3874.7 | -1.76% | 4848.8 | 4684.3 | -3.39% |

FIG.13

ELECTRONIC DEVICE FOR RAPID ENTRY INTO APPLICATION BEING RUN, METHOD OF OPERATING THE SAME, AND STORAGE MEDIUM

CROSS-REFERENCE TO RELATED APPLICATION(S)

This application is based on and claims priority under 35 U.S.C. § 119 to Korean Patent Application No. 10-2020-0015196, filed on Feb. 7, 2020, in the Korean Intellectual Property Office, the disclosure of which is incorporated herein by reference in its entirety.

BACKGROUND

1. Field

The disclosure relates generally to an electronic device, and more particularly, to an electronic device for scheduling tasks when an application is run, a method and storage medium for operating the same.

2. Description of Related Art

Along with the ever-increasing performance of electronic devices such as smartphones, various services are provided through the electronic devices. For example, an increasing number of applications provide high-end services using artificial intelligence (AI) technology such as Bixby and the Internet of things (IoT) through electronic devices.

Although the recent increase in the performance of electronic devices has consequentially increased application execution performance, it is time-consuming to enter a large-resource application. The application entry time tends to increase due to resources and various computations required for initial execution of the application. Moreover, the application entry speed may increase in proportion to the use time of an electronic device, and a large background load tends to delay entry into the application depending on a system situation. In this regard, efforts have recently been made to optimize the framework and kernel areas. One such effort involves scheduling, which refers to a program function of determining when and how much to distribute limited system resources to various tasks.

Once an application is executed, an application entry operation starts immediately after reception of a start event from a user. Tasks related to the application entry may be prioritized in order for rapid entry into the application to be realized. However, when priorities are assigned to all tasks related to the application entry as described above, the priorities of user interface (UI) and audio-related tasks may be delayed, thus causing incorrect UI drawings and audio noise.

Accordingly, there is a need in the art for a method of running an application without delay, other than the method of prioritizing tasks related to application entry, to facilitate rapid entry into an application that is being run.

SUMMARY

This disclosure is provided to address at least the above-mentioned problems and/or disadvantages and to provide at least the advantages described below.

Accordingly, an aspect of the disclosure is to provide an electronic device and a method thereof, in which an application is run without delay such that rapid entry into an application is realized.

Another aspect of the disclosure is to provide an electronic device and a method thereof, in which a processing runtime of at least one of tasks related to application entry is set to a minimum value during an application entry period, thereby facilitating rapid entry into the application.

In accordance with an aspect of the disclosure, an electronic device includes at least one processor, and a memory operatively coupled to the at least one processor. The memory stores instructions configured to enable the at least one processor to identify, in response to running of an application, a plurality of tasks related to a running operation of the application, allocate virtual runtimes to the plurality of tasks when scheduling, adjust the virtual runtime of at least one task to be run with priority among the plurality of tasks to be a minimum value, arrange the at least one task with the adjusted virtual runtime, and run the at least one task with priority according to an arrangement order.

In accordance with another aspect of the disclosure, a method of performing task scheduling, when an application is run in an electronic device, includes identifying, in response to running of an application, a plurality of tasks related to a running operation of an application, allocating virtual runtimes to the plurality of tasks, when scheduling, adjusting the virtual runtime of at least one task to be run with priority among the plurality of tasks to be a minimum value, arranging the at least one task with the adjusted virtual runtime, and running the at least one task with priority according to an arrangement order.

In accordance with another aspect of the disclosure, disclosed is a non-transitory storage medium which stores instructions configured to enable the at least one processor to perform at least one operation. The at least one operation may include identifying, in response to running of an application, a plurality of tasks related to a running operation of an application, allocating virtual runtimes to the plurality of tasks, when scheduling, adjusting the virtual runtime of at least one task to be run with priority among the plurality of tasks to be a minimum value, arranging the at least one task with the adjusted virtual runtime, and running the at least one task with priority according to an arrangement order.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a table listing percentage speed increases of application entries based on adaptive scheduling, when an application is run according to an embodiment.

DETAILED DESCRIPTION

Hereinafter, embodiments of the disclosure will be described in detail with reference to the accompanying drawings. Detailed descriptions of known functions and/or configurations will be omitted for the sake of clarity and conciseness.

The terms as used in the disclosure are provided to merely describe specific embodiments and are not intended to limit the scope of the disclosure. It is to be understood that singular forms include plural referents unless the context clearly dictates otherwise. The terms and words including technical or scientific terms used herein may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. Even though a term is defined in the disclosure, the term should not be interpreted as excluding embodiments of the disclosure under circumstances.

Figure 1:
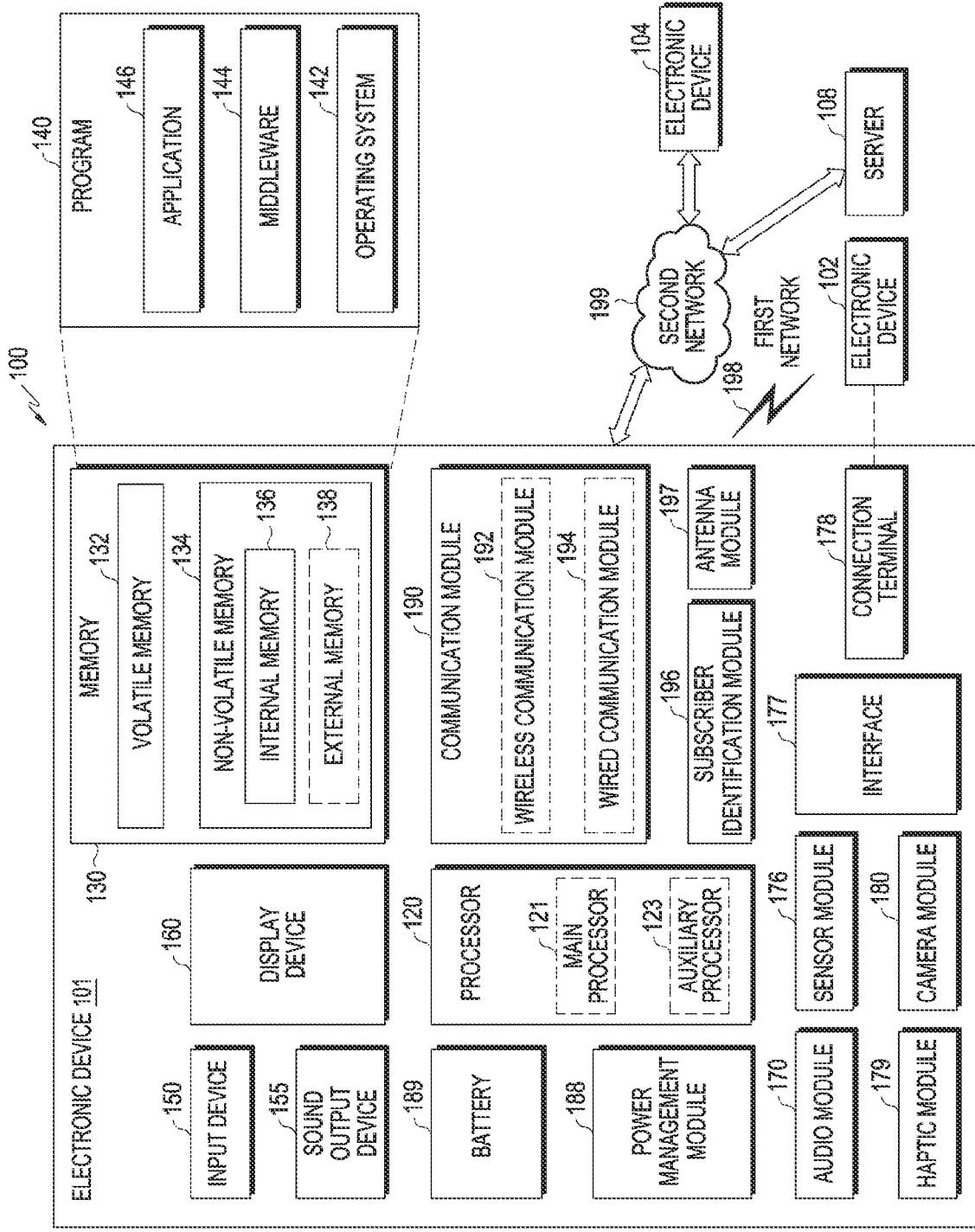
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
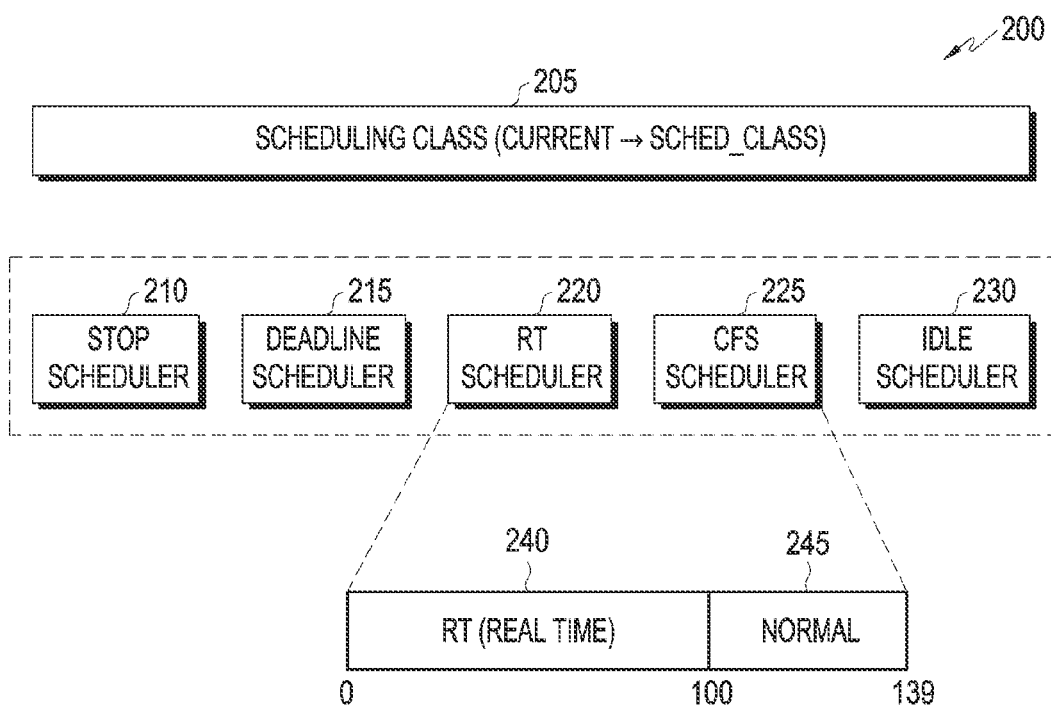
FIG. 2 illustrates scheduling classes according to an embodiment.

FIG. 2 illustrates scheduling classes according to an embodiment.

Referring to FIG. 2, a kernel provides five schedulers defined by a scheduling class 205, which include a stop scheduler 210, a deadline scheduler 215, a real time (RT) scheduler 220, a completely fair scheduler (CFS) scheduler 225, and an idle scheduler 230.

Among the schedulers, an operating system (OS) such as Android may schedule most tasks by using the RT scheduler 220 and the CFS scheduler 225. A task may be a basic unit of a program controlled by the OS, referring to a job executed in its own program area (e.g., code or a stack). For example, a task may refer to a minimum scheduling unit in an embedded system. Similarly to a task, a process or a thread may be a part of an independently runnable program. A process may refer to a running program of a specific application and may include one or more threads.

Normal tasks are mostly scheduled by the CFS scheduler 225. The RT scheduler 220 may process a task which needs to be continuously processed and occupies CPU resources.

A task processed by the RT scheduler 220, that is, an RT task, may always preempt CPU resources with priority over a task processed by the CFS scheduler 225. Tasks with the same RT attributes may preempt CPU resources in a run queue (RQ) (or an execution queue) input order (for example, first in first output (FIFO)). Because tasks to be processed are stored in the FIFO RQ, the tasks are sequentially dequeued from or enqueued into the FIFO RQ. Therefore, an operation of another type of task with CFS attributes (referred to as a CFS task) may be restricted until the RT tasks are completely operated. An RQ is a type of register located within a CPU, which may store tasks to be processed by a CPU. An RT task may be at least one of a graphics-related task or audio-related task requiring real-time processing.

In when the CFS scheduler 225, a normal task should always give CPU resources to an RT task and wait until tasks in the RQ or the RT task are completely operated.

The CFS scheduler 225 may schedule CFS tasks by distributing time to the CFS tasks according to their NICE values. A NICE value may represent a priority value) set in a user space. The CFS scheduler 225 may determine the order of processing tasks according to their priorities. Accordingly, a higher-priority task may be operated (or run) sooner in processing.

The CFS scheduler 225 may allocate additional CPU time to a higher-priority task within a given unit time. When the priority-based allocated time elapses, the next CPU time is allocated to another CFS task so that a specific CPU time may be allocated to each task even though the task has a lower priority.

For rapid entry into an application, CPU times need to be allocated to tasks related to the application entry without delay. For this purpose, one method of running a specific task without delay is to configure a specific task to have RT attributes.

Referring to FIG. 2, an RT task 240 has a priority ranging from 0 to 99 and is run with priority over a normal task 245, thus without delay.

The normal task 245 has a priority ranging from 100 to 139 and may be run by the CFS scheduler 225 and operated in time division according to its priority.

As described above, when RT attributes are granted to priority tasks to be run, the tasks may be run sequentially in a FIFO manner according to the RT attributes. However, when RT tasks increase in number, a contention situation may occur between the RT tasks. For example, while there are a number of types of tasks related to application entry and the tasks have very long runtimes, the operation time of an on-going RT task such as a graphics-related task or an audio-related task may be very short. Accordingly, when tasks other than RT tasks such as a graphics-related task or an audio-related task, i.e., other tasks related to application entry are all configured to have RT attributes, the RT tasks may be delayed in step order. In this case, UI-related and audio-related tasks are delayed in step order, causing an incorrect UI drawing and audio noise. Accordingly, because the increase of RT tasks in number may delay operations of existing RT tasks, there is needed a method of increasing an application entry speed, while ensuring execution of existing RT tasks.

For this purpose, the CFS scheduler 225 may adjust the CPU time of a task, such that the task runs rapidly with an RT task.

Figure 3A:
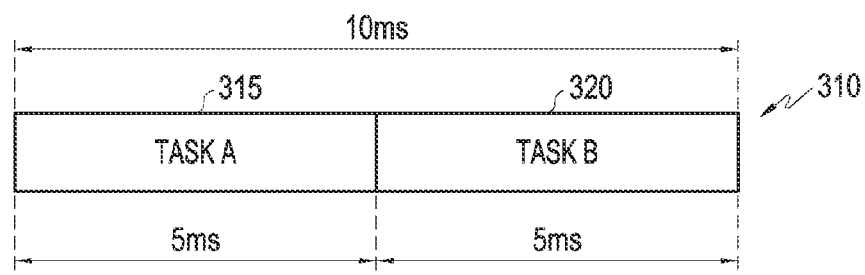
FIGS. 3A and 3B illustrate a method of allocating central processing unit (CPU) times to tasks according to an embodiment.
Figure 3B:
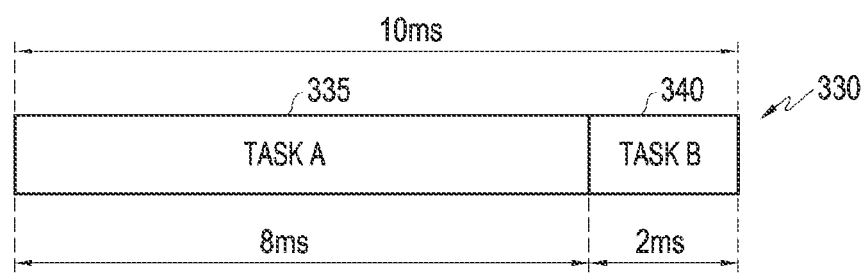

FIGS. 3A and 3B illustrate a method of allocating a CPU time to a task in the CFS scheduler 225 according to an embodiment. FIGS. 3A and 3B will be described separately, referring to instance 310 involving tasks with the same priority and instance 330 involving tasks with different priorities. The CFS scheduler 225 may schedule all tasks in a basic scheduling unit (e.g., 10 milliseconds (ms)).

Instance 310 of tasks with the same priority will now be described with reference to FIG. 3A. For example, when task A 315 and task B 320 have the same priority (for example, priority value=1), the basic scheduling unit 10 ms may be divided between the two tasks according to the same priority and thus a 5-ms CPU time may be allocated to each of the tasks. The virtual runtime (vruntime) of task A 315 has increased by as much as a runtime of task A 315 and reached a given 5 ms (=10 ms*1/(1+1)). Therefore, task A 315 may allot a CPU time to the next task B 320.

Referring to FIG. 3B, in instance 330 of tasks with different priorities, such as when task A 335 has a priority value of 4 four times greater than a priority value of 1 for task B 340, the virtual runtime of task A 335 may reach 5 ms only when task A 335 runs for 8 ms (=10 ms*4/(4+1)). In contrast, task B 340 has only to run for 2 ms (=10 ms*1/(4+1)) to reach the virtual runtime of 5 ms. Task A 335 and task B 340 may exhaust the basic scheduling unit 10 ms for priority-based time periods, while running for 8 ms and 2 ms, respectively. As such, the CFS scheduler 225 may schedule tasks such that each task uses a predetermined portion of a CPU time given for all tasks.

Accordingly, as the CFS scheduler 225 is to process more tasks, a CPU time allocated to each task based on the basic scheduling unit may decrease. Accordingly, even though a task has an increased priority, the task is configured to allot a CPU time in a specific system situation. Therefore, even though the priority of the task is increased, the task may be unable to preempt a CPU time based on priority in some system situations such as a lock situation. Accordingly, there is a need to consider a method of ensuring a CPU runtime, other than the method of changing a priority by the CFS scheduler 225.

Figure 4:
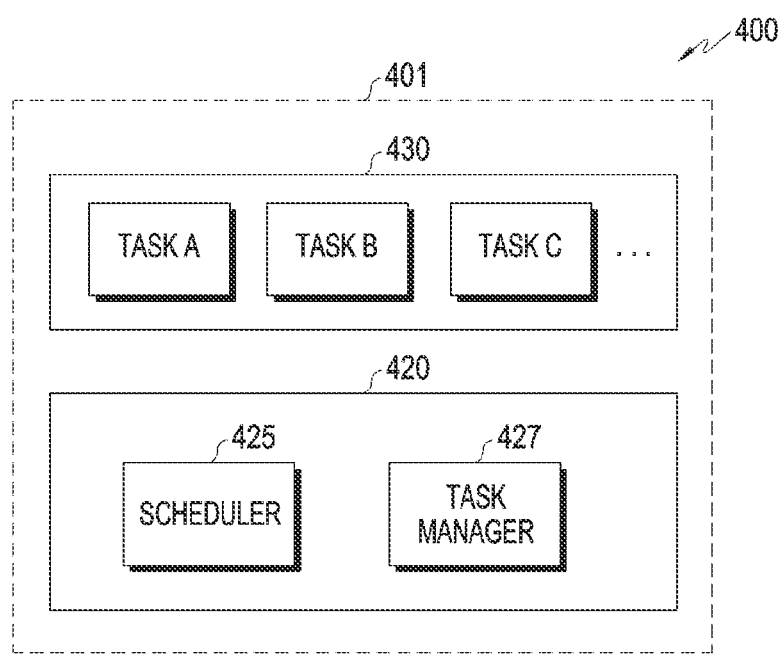
FIG. 4 is an internal block diagram illustrating an electronic device for adaptive scheduling according to an embodiment.

FIG. 4 is an internal block diagram 400 illustrating an electronic device for adaptive scheduling according to an embodiment.

Referring to FIG. 4, an electronic device 401 may include at least one processor 420 and a memory 430.

The at least one processor 420 may process a task (or operation) using at least one thread. For example, the at least one processor 420 may include a CPU and process an allocated task. The at least one thread may include a main thread.

The main thread may process a user input and a UI update request. A main thread may be allocated or generated for each application and may run a task of which the performance is identifiable to a user, such as input processing and UI update.

The at least one processor 420 may include a scheduler 425 and a task manager 427.

The scheduler 425 may schedule a target task in a waiting state or ready state in the memory 430 and allocate the task to the at least one processor 420 according to the scheduling so that the task is processed by the at least one processor 420.

The scheduler 425 allocates a runnable unit time, referred to as a time slice, to each process. For example, when the basic scheduling unit time 10 ms is assigned to a process and the process is run, occupying the CPU for 10 ms, it may be said that the given time slice has expired. As such, a time slice refers to a maximum time available for CPU occupancy. As a weight may be applied to a task according to the priority of the task, a higher-priority task may use the CPU for a longer period of time.

The scheduler 425 may periodically measure and manage a vruntime for each task (or process) internally. The scheduler 425 may be a CFS.

The scheduler 425 may update the virtual runtime of a task based on its priority value (for example, NICE value) each time the task is scheduled. The virtual runtime of each task may increase by as much as the runtime of the task. However, a lower-priority task may have a larger virtual runtime increment, whereas a higher-priority task may have a smaller virtual runtime increment. For example, the scheduler 425 increases the virtual runtime of a task by as much as a time during which the task uses the CPU. For fair CPU time allocation, the scheduler 425 may increase the virtual runtime of a higher-priority task by a value less than an increment of the virtual runtime of a lower-priority task.

The scheduler 425 may adjust the priorities of tasks related to application entry without registration the tasks to the RT scheduler 220, by using virtual runtimes corresponding to CPU runtimes, as described above. Accordingly, the scheduler 425 may change the priorities of CFS tasks by adjusting their virtual runtimes without adjusting their NICE values ranging from 100 to 139.

When the virtual runtime of a priority target task to be run is set to a minimum value, a target task to which a minimum virtual runtime has been allocated may be run next. As described above, a task with the minimum of the virtual runtimes of tasks in the waiting state in an RQ is selected as the next task to be run. Therefore, the same effect as achieved by increasing the NICE value of the task and thus running the task first may be obtained.

A task may be processed rapidly by controlling the virtual runtime of the task without increasing the NICE value of the task in a situation such as a binder call or a lock occurring in a main thread.

Tasks in the waiting state or ready state in the memory 430 may be allocated to the at least one processor 420 through scheduling of the scheduler 425. Therefore, the tasks are switched from the waiting state or ready state to a running state to be processed in the processor 420.

While the scheduler 425 and the task manager 427 are shown in FIG. 4 as included in the at least one processor 420, the scheduler 425 and the task manager 427 may be configured into independent modules separate from the at least one processor 420.

When an application is run according to a user's request or a preset schedule, the task manager 427 may generate a plurality of tasks related to the execution of the application and transmit the generated tasks to the scheduler 425. The task manager 427 may monitor whether the plurality of tasks related to the execution of the application are in the waiting state, the ready state, the running state, or a stop state, and transmit a monitoring result to the scheduler 425. The task manager 427 may set at least one task or thread as a priority target to be run or delete the at least one task or thread from priority targets based on the monitoring result. The priority targets may include at least one task or thread and may be listed.

A priority target may be referred to as FTT, and a plurality of tasks may be managed in a priority target list or an FTT list. Accordingly, a plurality of tasks related to application entry among tasks that are in the waiting or ready state in relation to execution of an application may be processed by the at least one processor 420 according to scheduling.

When the user requests execution of an application, the task manager 427 may manage a plurality of tasks related to entry into the application by using their IDs, separately from waiting-state or ready-state tasks. One application includes a plurality of threads or a plurality of tasks. For example, a plurality of threads may be generated for one process, and each thread may be identified by a process ID (PID). Both a process and a thread are referred to as a task in the kernel area, and a PID may be a task ID.

Accordingly, a main thread related to application entry may be set as an FTT by using the PID of the main thread. When the application is run, all threads generated in relation to the application may have different PIDs, and the main thread may be set as an FTT by using the PID of the main thread. A task or thread as a priority target may be referred to as an FTT.

As such, the moment the application is entered, the task manager 427 belonging to a framework may transmit information related to the FTT to the scheduler 425 belonging to the kernel area so that the virtual runtime of the FTT may be managed. For example, the information related to the FTT may include the ID of the FTT and information about the state of the FTT.

The scheduler 425 may set a minimum virtual runtime for a task (or thread) set as an FTT, when scheduling. Tasks to be processed by at least one processor are stored in one RQ, and among RQs, tasks with priorities adjusted according to the virtual runtime adjusted by the scheduler 425 may be sequentially stored in a CFS RQ. The virtual runtime of each task may be determined by updating the CPU use time of the task periodically at every scheduler tick.

A task with a minimum virtual runtime may be selected as the next scheduling target. The scheduler 425 may force adjustment of the virtual runtime of an FTT to a minimum value such that the FTT may be selected first as the next scheduling target, instead of the task with the previous minimum virtual runtime. Accordingly, the scheduler 425 may set the virtual runtime of the FTT to be less than the previous minimum virtual runtime.

For example, let the minimum virtual runtime be denoted by (min_vruntime). Then, the virtual runtime of the FTT may be set to a value obtained by subtracting an arbitrary value from the min_vruntime so that the virtual runtime of the FTT is less than the minimum virtual runtime. Since the min_vruntime may also be periodically updated at every scheduler tick, the minimum virtual runtime may also be changed.

For example, the scheduler 425 may obtain the virtual runtime (for example, FTT vruntime) of the FTT based on Equation (1) below.

$$FTT\ vruntime = CFS\ RQ'S\ Min\_vruntime - sched\_latency\_ns \quad (1)$$

In Equation (1), the FTT vruntime of the FTT is a value obtained by subtracting a system latency (for example, sche_latency_ns) (or minimum delay time between schedulings) from the min_vruntime.

The scheduler 425 may arrange a plurality of tasks related to application entry in a CFS RQ red-black (RB) tree based on their virtual runtimes. The structure of an RB tree is illustrated in FIG. 5.

Figure 5:
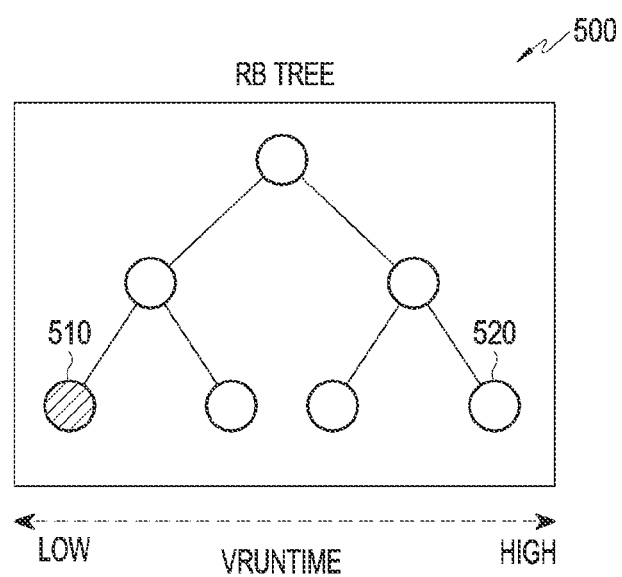
FIG. 5 illustrates the structure of a red-black (RB) tree according to an embodiment.

FIG. 5 illustrates the structure of an RB tree 500 according to an embodiment. As illustrated in FIG. 5, a task with the minimum of the virtual runtimes of tasks is located at a leftmost node 510 of the RB tree 500 of a CFS RQ. When the next task is procured, the task at the leftmost node 510 may be run first. On the other hand, a task with the largest virtual runtime may be located at a rightmost node 520, and run later due to its low priority.

The scheduler 425 may register a plurality of tasks in the RB tree of the CFS RQ based on their virtual runtimes. For example, the plurality of tasks registered in the RB tree may correspond to processes related to an application which has been run. Among the above-described plurality of tasks, the scheduler 425 may set a task related to application entry, which may increase the entry speed, as an FTT and place the FTT at the leftmost node 510 of the RB tree, so that the FTT may be run first at the next time. For this purpose, the scheduler 425 may determine the virtual runtime of the task set as the FTT to be less than a current min_vruntime based on the virtual runtimes of the tasks already registered to the CFS RQ.

While the RB tree illustrated in FIG. 5 is for when one task as an FTT, that is, for when disposing one FTT, by way of example, a case of two or more FTTs will now be considered.

Figure 6:
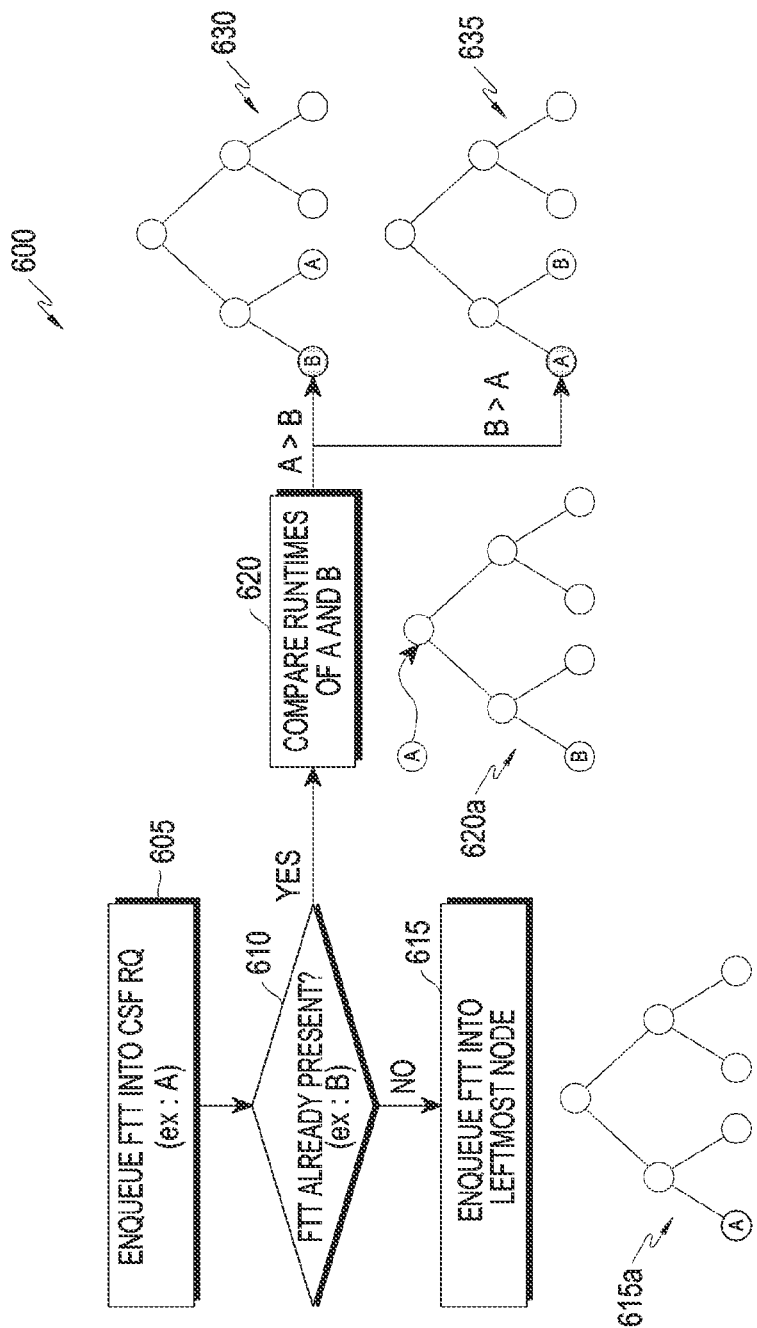
FIG. 6 illustrates a case of two or more priority target tasks according to an embodiment.

FIG. 6 is a diagram 600 illustrating a case of two or more FTTs according to an embodiment.

Referring to FIG. 6, when there are two or more FTTs in the CFS RQ, the scheduler 425 may place one of the FTTs at the leftmost node of an RB tree so that the FTT may be procured first.

Specifically, with a priority target, that is, an FTT (for example, task A) enqueued in the CFS RQ in step 605, it is determined whether there is already an FTT present in step 610. If there is no FTT already, that is, if there is no FTT other than the FTT enqueued in the CFS RQ, only one FTT (for example, task A) needs to be allocated to the RB tree. Therefore, the new enqueued FTT may be disposed (or registered) at the leftmost node of the RB tree in step 615. Accordingly, similar to an RB tree indicated by reference numeral 615*a*, the FTT (for example, task A) may be disposed at the leftmost node of the RB tree.

If there is already an FTT (for example, task B) in step 610, the scheduler 425 may compare the runtime of the FTT (for example, task B) already enqueued in the CFS RQ with that of the newly enqueued FTT (for example, task A) in step 620. As with an RB tree indicated by reference number 620*a*, to determine a node at which the newly enqueued FTT (for example, task A) is to be located when an FTT (for example, task B) has already been placed at the leftmost node of the RB tree, their runtimes may be compared.

When the runtime of the newly enqueued FTT (for example, task A) is greater than that of the FTT (for example, task B), the position of the FTT (e.g., task B) with the smaller runtime may be maintained, and the newly enqueued FTT (for example, task A) may be disposed at a position corresponding to the next turn.

When the runtime of the newly enqueued FTT (for example, task A) is less than that of the FTT (e.g. task B), the FTT (for example, task B) at the leftmost node may be replaced with the newly enqueued FTT (for example, task A) so that a plurality of tasks including the FTTs may be rearranged.

When there are two or more tasks as FTTs in the CFS RQ, a task with the minimum of the runtimes of the two or more tasks as FTTs may be positioned at the leftmost node of the RB tree so that the task may be procured first.

After the virtual runtime of one task is set to a minimum value, the virtual runtime of the next FTT to be run may be set to a value be greater than the virtual runtime of the task and less than the min_vruntime.

As such, when a plurality of tasks is set FTTs, they may be rearranged in the RB tree based on the result of comparing the runtimes of the plurality of tasks. Tasks that are running in relation to other applications may also be arranged in the −B tree. When an application is entered, at least one task corresponding to an FTT related to the application entry may be registered to the RB tree. Accordingly, the tasks may be rearranged in the RB tree.

Even though the next task in the CFS RQ must be procured according to occurrence of at least one event of load balancing, preemption, or a scheduler tick, triggers pick-up of the next task in the CFS RQ, when there is an FTT, the scheduler 425 mat set may set the virtual runtime of the FTT to be a minimum value so that the FTT may be procured and run first.

According to an embodiment, an electronic device includes at least one processor and a memory operatively coupled to the at least one processor. The memory may store instructions configured to enable the at least one processor to, in response to running of an application, identify a plurality of tasks related to a running operation of an application, allocate virtual runtimes to the plurality of tasks, when scheduling, adjust the virtual runtime of at least one task to be run with priority among the plurality of tasks to a minimum value, arrange the at least one task with the adjusted virtual runtime, and run the at least one task with priority according to an arrangement order.

The instructions may be configured to enable the at least one processor to set a minimum virtual runtime, when the scheduling, and adjust the virtual runtime of the at least one task to be run with priority to be less than the minimum virtual runtime.

The at least one task to be run with priority may be a main thread of the application.

The instructions may be configured to enable the at least one processor to identify the at least one task to be run with priority by using PIDs of the plurality of tasks.

The at least one task to be run with priority may be a task related to a binder call.

The instructions may be configured to enable the at least one processor to arrange the at least one task to be run with priority based on an RB tree structure.

The at least one task to be run with priority may be allocated to a leftmost node in the RB tree.

The instructions may be configured to enable the at least one processor to, when two or more of the plurality of tasks are to be run with priority, compare the virtual runtimes of the two or more tasks, and allocate a task having a minimum virtual runtime to the leftmost node of the RB tree.

The plurality of tasks may be scheduled by a CFS.

Figure 7:
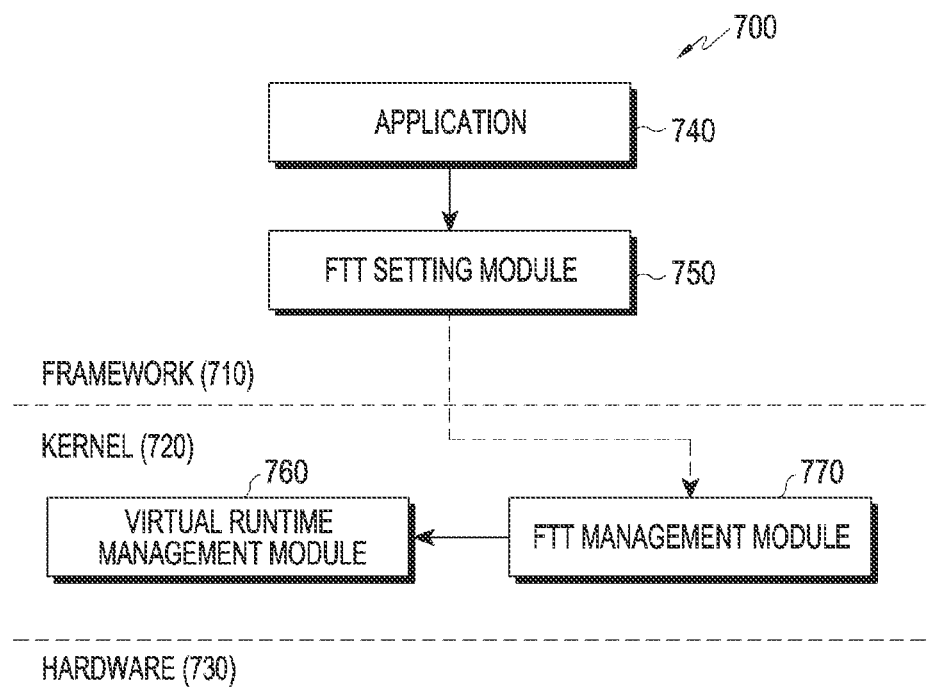
FIG. 7 illustrates a hierarchical software architecture according to an embodiment.

FIG. 7 is a conceptual diagram 700 illustrating a hierarchical software architecture according to an embodiment.

Referring to FIG. 7, the hierarchical software architecture may include a framework 710 and a kernel 720, as with the basic OS structure of Android. While only the framework 710 and the kernel 720 are illustrated in FIG. 7, other modules (or components) may further be included. The operations of an FTT setting module 750 and an FTT management module 770 may correspond to the operation of a task manager, and the operation of a virtual runtime management module 760 may correspond to the operation of a scheduler.

The kernel 720 is a component of an OS, which may perform a control operation between the framework 710 and hardware 730. The kernel 720 may be responsible for program execution, interrupts, multitasking, and memory management, and include file systems and device drivers.

The kernel 720 is a vital core of the computer OS, and provides various services to all other parts of the OS. In general, the kernel includes an interrupt handler that processes all requests competing for kernel services such as terminated input/output (I/O) operations, a scheduler that determines which programs share the processing time of the kernel in what order, and a supervisor that authorizes each process to use the computer, when scheduling ends.

The kernel 720 includes a memory manager that manages the address space of the OS in a memory or a storage device and distributes the address space to all peripheral devices and other users who use kernel services. A service of the kernel 720 may be requested through other parts of the OS or a series of program interfaces known as stem calls. Since code for maintaining the kernel 720 is continuously used, the kernel 720 may be loaded in a protected memory area so as not to be overwritten and damaged by the rest of the OS, which is not used frequently.

In Linux, a process or thread may be managed as an object referred to as a task inside the kernel 720.

An application 740 may be managed under the framework 710, and the framework 710 may include the FTT setting module 750. The application 740 may be run according to a user request or a preset schedule.

As described above, a graphics-related task may be set as an FTT from among CFS tasks in response to the execution of the application 740, such that the FTT may be run first and thus the user may experience the increased speed of an application entry.

The FTT setting module 750 sets a task to be run first as an FTT by increasing its priority without changing its priority value (for example, NICE value) among CFS tasks. The FTT may also be referred to as the priority target.

For tasks related to entry of the application 740, a main thread which processes a user touch or is related to the OS and a rendering-related thread that configures a screen for a UI, the FTT setting module 750 may identify the PIDs of the threads to set the threads as FTTs. Subsequently, the FTT setting module 750 may transmit information about the FTTs, including the PIDs of the threads to the FTT management module 770 belonging to the kernel 720.

A PID is information identifying a task, and threads in one process may share the same PID. Therefore, once a task is generated, a PID may be assigned to the task.

The FTT management module 770 may function to manage an FTT based on information about the FTT, received from the FTT setting module 750. For example, the FTT management module 770 may distinguish tasks from each other by using PIDs, and manage an FTT list by setting a task as an FTT or removing a task which is an FTT by using a PID.

Regarding a binder call, the FTT management module 770 may set a task (or thread) related to the binder call as an FTT. For example, during a binder transaction, when the transaction occurs to an FTT, the FTT management module 770 may set a thread that processes the transaction as an FTT. The FTT management module 770 may release the thread processing the transaction from the FTT, when receiving a reply.

A brief description will be given of the above-described binder call.

The Android OS may provide a component model on a process basis and may be constructed in Java based on Linux. Applications running on the Android OS may run as independent processes in Linux, and applications made in Java may be run through a Java virtual machine.

Since all applications are provided as processes, a mechanism of transmitting requests and responses to other processes may be needed for interworking between the applications. The mechanism for such inter-process communication is a binder. For example, functions provided by different processes may be provided through a binder on the Android OS.

A binder driver may be used to share programs and data required to implement an intended service, when an application is run. For example, an application may perform communication by invoking a system call provided by Linux. Therefore, it may be possible to exchange data between different applications or different services according to a binder call.

When a task related to a binder call is set as an FTT to run first, a service intended with an application which is to be entered may be smoothly implemented.

Figure 8:
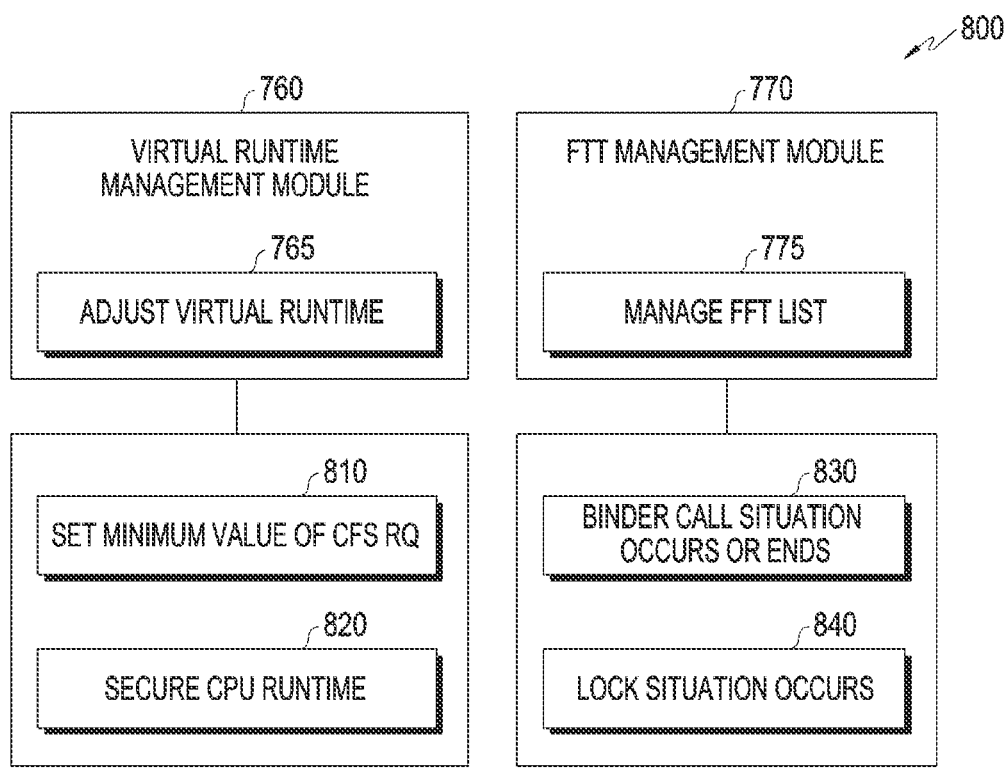
FIG. 8 is a block diagram illustrating operations of a virtual runtime management module and a fast track thread (FTT) management module according to an embodiment.

FIG. 8 is a diagram 800 illustrating operations of the virtual runtime management module and the FTT management module according to an embodiment.

Referring to FIG. 8, the operations of the virtual runtime management module 760 and the FTT management module 770 may be performed in the same manner as described with reference to FIG. 7.

For example, as illustrated in FIG. 8, the FTT management module 770 may set a task to be run first among CFS tasks related to application entry as an FTT, and manage the tasks in the form of an FTT list in the presence of multiple tasks set as FTTs in step 775.

The virtual runtime management module 760 may adjust the virtual runtime of a task in step 765. For virtual runtime adjustment, the virtual runtime management module 760 may set the minimum value of the CFS RQ, that is, a min_vruntime in step 810 and secure a CPU runtime in step 820.

The virtual runtime management module 760 may adjust the virtual runtime such that an FTT to be run first among CFS tasks related to application entry has a minimum virtual runtime in step 765. For example, the virtual runtime management module 760 may adjust the virtual runtime (for example, FTT vruntime) of the FTT in the manner described in Equation (1) such that the virtual runtime is less than the min_vruntime.

The FTT management module 770 may set a main thread as an FTT from among the CFS tasks related to application entry and set the virtual runtime of the FTT to a minimum value so that the main thread may be run first. Accordingly, the FTT corresponding to the main thread may be placed at the leftmost mode of the RB tree of the CFS RQ so that the FTT may be procured and run first.

The FTT management module 770 may also set a related FTT as an FTT in processing a binder call or in a lock situation, as well as the main thread, such that the task may be run first.

The FTT management module 770 may update and manage the FTT list in response to occurrence or termination of a binder call situation in step 830. For example, when a binder call situation occurs, the FTT management module 770 may enqueue a task related to the binder call into the FTT list so that the task may be run first. Accordingly, the task related to the binder call may be placed at the leftmost node of the RB tree of the CFS RQ so that the task may be procured and run first, when scheduling.

When the binder call situation ends, the task related to the binder call may be dequeued from the FTT list. Accordingly, the task related to the binder call may be released from the RB tree of the CFS RQ. The FTT management module 770 may update and manage the FTT list in response to occurrence of a lock situation in step 840. For example, when the lock situation occurs, even the main thread should wait until the lock situation is released. An FTT corresponding to the main thread may be disposed at a highest position of a waiting list in the lock situation so that the FTT may be run first. For example, upon occurrence of a lock situation such as mutual exclusion object (mutex), futex, or semaphore, the FTT management module 770 may place the FTT at the highest position of the waiting list for the lock situation in response to the occurrence of the lock situation.

Figure 9:
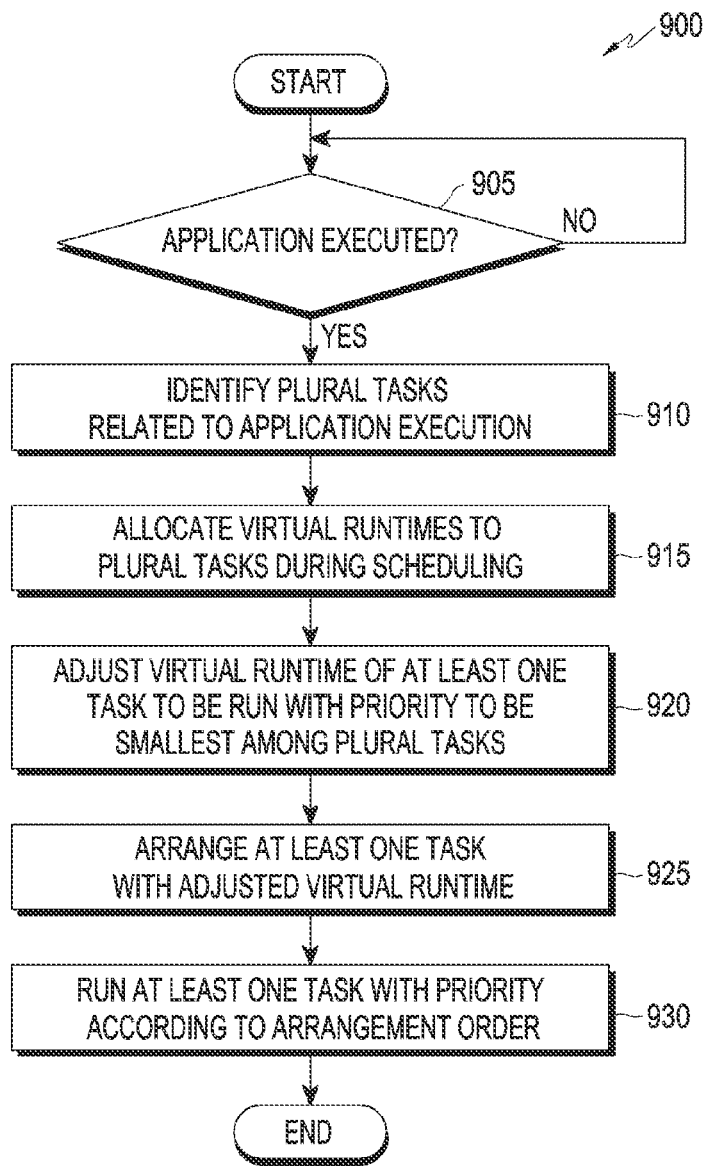
FIG. 9 is a flowchart illustrating an operation of an electronic device for adaptive scheduling according to an embodiment.

FIG. 9 is a flowchart 900 illustrating an operation of an electronic device for adaptive scheduling according to an embodiment.

Referring to FIG. 5, each step/operation may be performed by at least one of the electronic device, at least one processor of the electronic device, an embedded system, or a task manager as described herein. At least one of steps 905 to 930 may be omitted, the sequence of some of the steps 905 to 930 may be changed, or other steps may be added.

In step 905, the electronic device may identify whether an application is run. Subsequently, the electronic device may identify a plurality of tasks related to the execution of the application in step 910. At least one task to be run first may be identified by using the PIDs of the plurality of tasks.

In step 915, the electronic device may assign virtual runtimes to the plurality of tasks, when scheduling. For example, a CFS assigns CPU runtimes to the plurality of tasks according to their priority values, when scheduling. The virtual runtime of each task may be updated based on the CPU runtime of the task, and the updated virtual runtimes may be assigned to the plurality of tasks.

In step 920, the electronic device may adjust the virtual runtime of the at least one task to be run first among the plurality of tasks to a minimum value. The electronic device may set a minimum virtual runtime at each scheduling and set the virtual runtime of the at least one task to be run first to be less than the existing minimum virtual runtime.

In step 925, the electronic device may arrange the at least one task with the adjusted virtual runtime. The electronic device may also arrange the other tasks as well as the at least one task with the adjusted virtual runtime in an RB tree. Among the tasks, the at least one task with the adjusted virtual runtime may be placed at the leftmost node of the RB tree.

In step 930, the electronic device may run at least one task first according to the arranged order. In this case, the task set to the minimum virtual runtime, that is, the task arranged at the leftmost node of the RB tree may be run first, even though the task has a low priority value.

According to an embodiment, a method of performing task scheduling, when an application is run in an electronic device, includes, in response to running of an application, identifying a plurality of tasks related to a running operation of an application, when the application is run, allocating virtual runtimes to the plurality of tasks, when scheduling, adjusting the virtual runtime of at least one task to be run with priority among the plurality of tasks to be a minimum value, arranging the at least one task with the adjusted virtual runtime, and running the at least one task with priority according to an arrangement order.

The adjustment of the virtual runtime of at least one task to be run with priority to be the minimum value may include setting a minimum virtual runtime when the scheduling and adjusting the virtual runtime of the at least one task to be run with priority to be less than the minimum virtual runtime.

The at least one task to be run with priority may be a main thread of the application.

Identifying a plurality of tasks related to a running operation of an application may include identifying the at least one task to be run with priority by using PIDs of the plurality of tasks.

The at least one task to be run with priority may be a task related to a binder call.

The arrangement may include arranging the at least one task to be run with priority based on an RB tree structure.

The at least one task to be run with priority may be allocated to a leftmost node in the RB tree.

The method may further include, when two or more of the plurality of tasks are to be run with priority, comparing the virtual runtimes of the two or more tasks, and allocating a task having a minimum virtual runtime to the leftmost node of the RB tree.

The plurality of tasks may be scheduled by a CFS.

Figure 10:
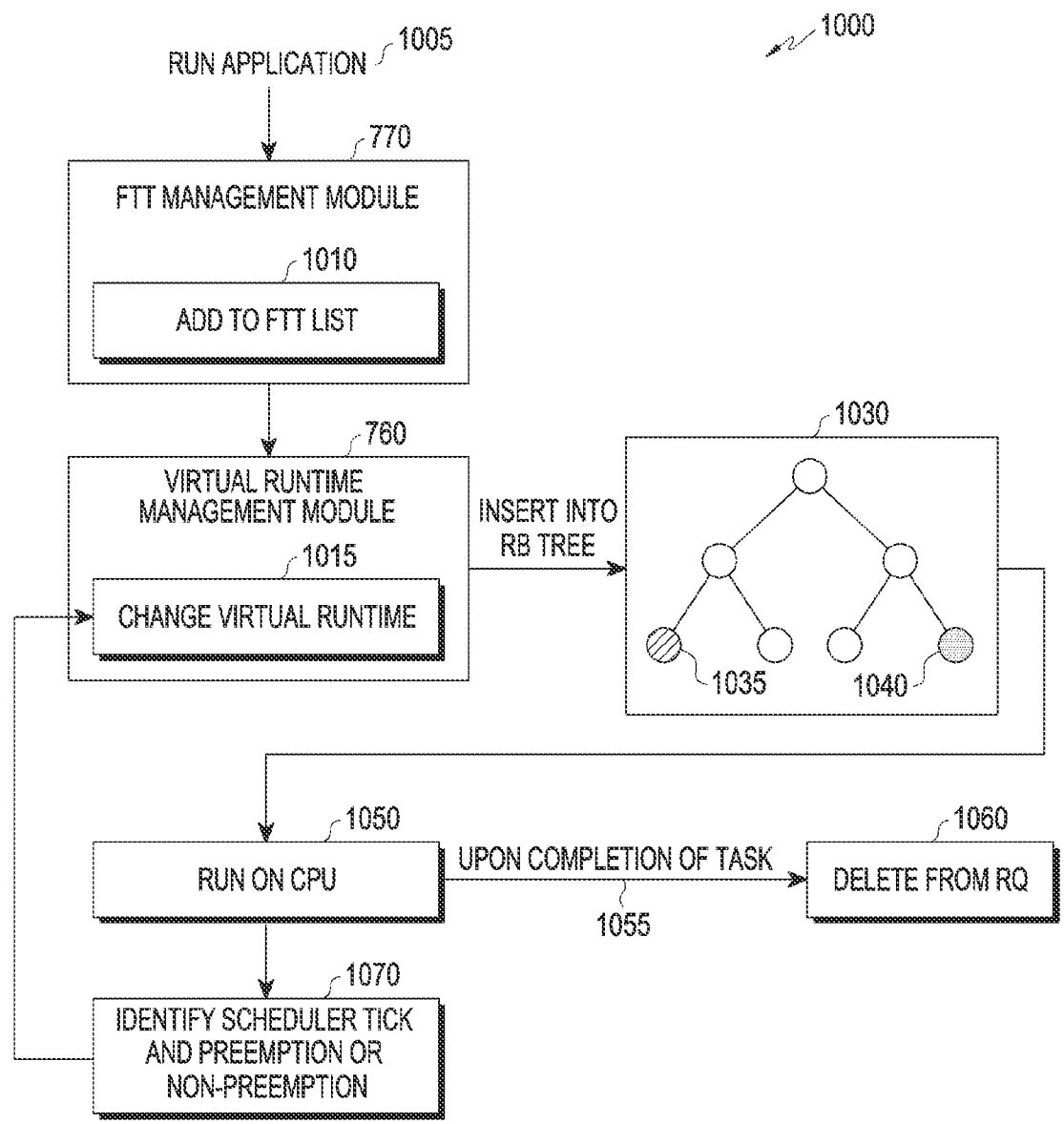
FIG. 10 is a block diagram illustrating a task scheduling process, when an application is run according to an embodiment.

FIG. 10 is a diagram 1000 illustrating a task scheduling process, when an application is run according to an embodiment.

Referring to FIG. 10, when an application is run in step 1005, the FTT management module 770 may add at least one task related to the execution of the application to an FTT list in step 1010. Subsequently, the virtual runtime management module 760 may change a virtual runtime in step 1015 and insert the at least one task into an RB tree 1030 according to the changed virtual runtime. A task set as an FTT may be disposed at a leftmost node 1035 of the RB tree 1030. The task may then be run on a CPU based on the structure of the RB tree 1030 in step 1050. Upon completion of the task in step 1055, the FTT may be deleted from an RQ in step 1060.

While the task is running on the CPU, a scheduler tick time and preemption or non-preemption may be identified in step 1070. Each time the scheduler tick time arrives or preemption or non-preemption is identified, the virtual runtime management module 760 may perform step 1015 of changing a virtual runtime. Identifying preemption or non-preemption may correspond to determining the next task in the RB tree.

For example, the virtual runtime of a task set as an FTT is accumulated by as much as the runtime of the task on the CPU. Therefore, when it is time to procure the next task according to the condition of load balancing as well as the scheduler tick and preemption or non-preemption, the task may not be disposed at the leftmost node 1035 of the RB tree 1030. Rather, as the runtime of the task is accumulated, the task may be disposed at a rightmost node 1040, thus giving its scheduling turn to another task. However, since the task set as an FTT is controlled such that the task may be disposed at the leftmost node 1035 of the RB tree 1030 irrespective of accumulation of the runtime even at a time to procure the next task, the task may be procured and run with the highest priority. As such, the effect of increasing the priority of a CFS task set as an FTT may be expected simply by changing the virtual runtime of the FTT without changing the priority value (e.g., NICE value) of the CFS task.

Figure 11:
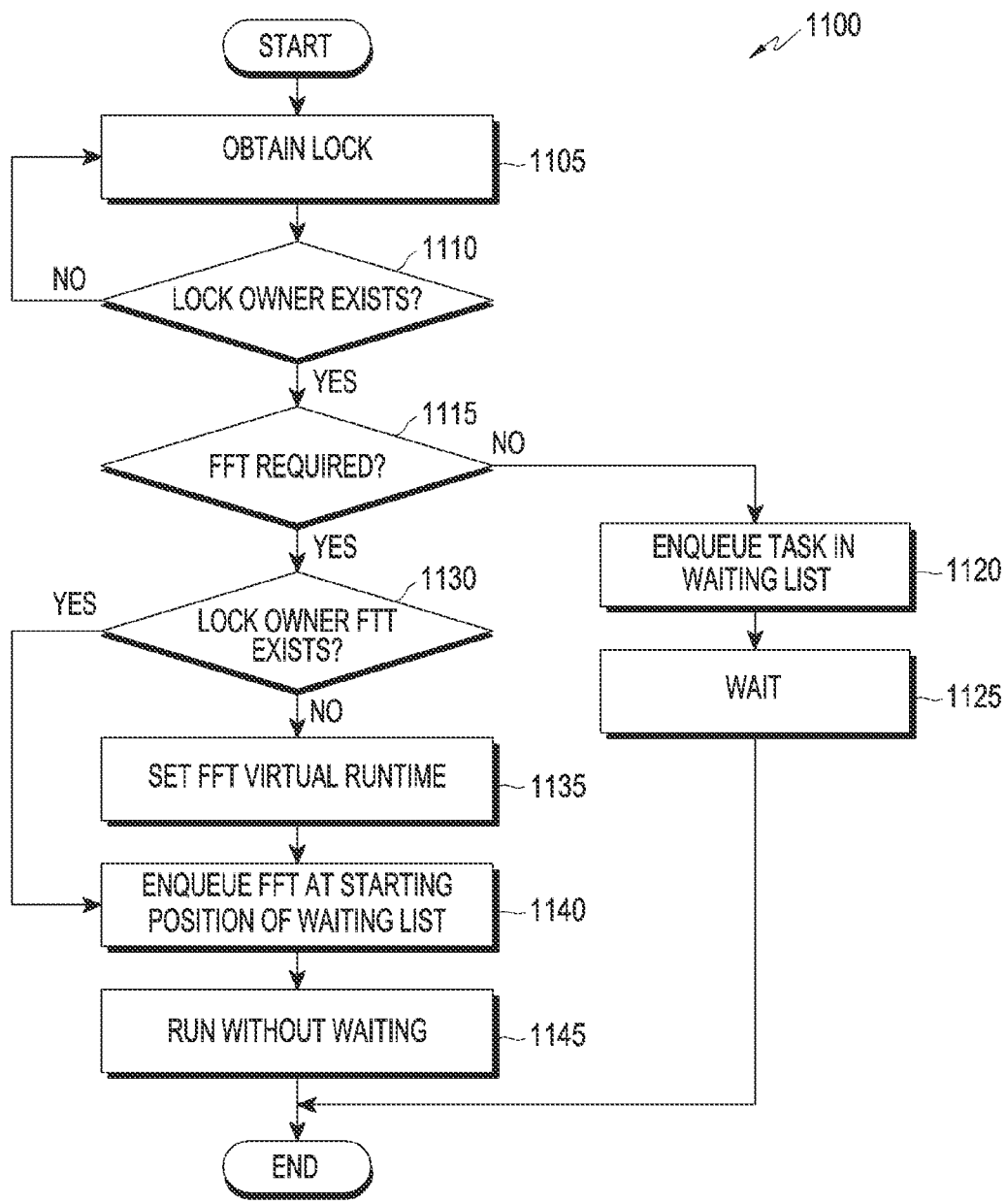
FIG. 11 is a flowchart illustrating an FTT setting operation in a lock situation according to an embodiment.

FIG. 11 is a flowchart 1100 illustrating an operation of setting an FTT in a lock situation according to an embodiment. Prior to describing FIG. 11, the lock situation will now be described.

In a lock contention situation, a task may not be run in real time. As the number of lock contention periods increases, an entry time may be lengthened. Preemption does not occur in a lock situation. A lock period may be referred to as a preemption impossible period, a lock area, or a minimum data area to be protected in a kernel area.

For example, there may be a situation in which object A related to entry is to be necessarily accessed and changed during application entry, and it is assumed that two processes using object A exist, such as a target application to be entered and a system server SYSTEM_SERVER. Both the main thread of the application and the system server process may be CFS tasks.

In a situation in which other operations of the main thread of the application have been rapidly completed by increasing the priority value of the main thread of the application but the main thread is to be updated by access to object A, object A is protected by the system server process and thus the main thread of the application should wait until object A is unlocked in the system server process. Moreover, when the system server process is delayed by another thread operation and thus is waiting in a runnable state without preempting CPU resources, the main thread of the application may have to wait until the system server process is released from the waiting state and unlock object A.

When a lock situation is generated despite the increase of the priority value of the main thread as described above, the main thread may be in the waiting state until the lock situation is released. Therefore, when the main thread is to obtain the lock, an owner having the lock may be temporarily set as an FTT. The owner will be further described below.

Therefore, when the main thread is to be processed with priority but another process (or task) owns a lock, the main thread should wait. Therefore, the process (or task) owning the lock, and thus, processing the main thread, should be rapidly performed. For this purpose, the process owning the lock may be temporarily set as an FTT to be processed with the highest priority.

As such, the priority of a task owning a lock may be increased by setting the task as an FTT.

For example, a task which is using a lock may be identified and set as an FTT. Accordingly, an FTT virtual runtime may be set for the lock owner, and the FTT may be run without waiting according to the set virtual runtime. On the contrary, when there is already another FTT among lock owners, the FTT may be placed at the highest position in the waiting list, so that the FTT may be run immediately without waiting. Accordingly, a task which has not been set as an FTT is placed at the lowest position of the waiting list for a lock and thus should wait until the previous waiter in the waiting list processes the lock. In contrast, the FTT is placed at the highest position of the waiting list and thus may be run fast without waiting. Therefore, the speed of application entry may be increased even in a lock situation.

As described above, the priority of a lock owner may be increased by temporarily setting the lock owner as an FTT or enqueuing an FTT at a highest-priority position on a waiting list.

Turning now to FIG. 11, when the main thread of a runnable application intends to obtain a lock in step 1105, the FTT management module 770 may identify whether there is a lock owner in step 1110. Lock mechanisms such as mutex, futex, and semaphore are available for the lock. Mutex refers to an object for excluding simultaneous use of one resource among multiple tasks. When it is said that a task locks a mutex for a resource, this indicates that the task owns the mutex for the resource. Only this task may use the resource and release the mutex lock from the resource.

Subsequently, the FTT management module 770 may identify whether an FTT is required in step 1115. For example, the FTT management module 770 may identify whether the lock owner needs to be set as an FTT to process the main thread and temporarily set the lock owner as an FTT. When an FTT is not required, that is, in when a normal task, the task may be enqueued in a waiting list in step 1120 and wait in step 1125. For example, when there are other tasks enqueued in the waiting list, the task may wait until all of the other tasks are operated and thus the lock is released.

On the contrary, when an FTT is required in the lock situation in step 1115, the FTT management module 770 may identify whether there is a lock owner FTT in step 1130. For example, the FTT management module 770 may determine whether there is already an FTT as a lock owner. In the absence of any lock owner FTT, an FTT virtual runtime may be set in step 1135 and the FTT may be enqueued into a starting position, that is, a highest-priority position of the waiting list in step 1140. Therefore, the FTT may be processed fast without waiting as in step 1145. When there is already a lock owner FTT in step 1130, the procedure may jump to step 1140, bypassing step 1135.

Figure 12:
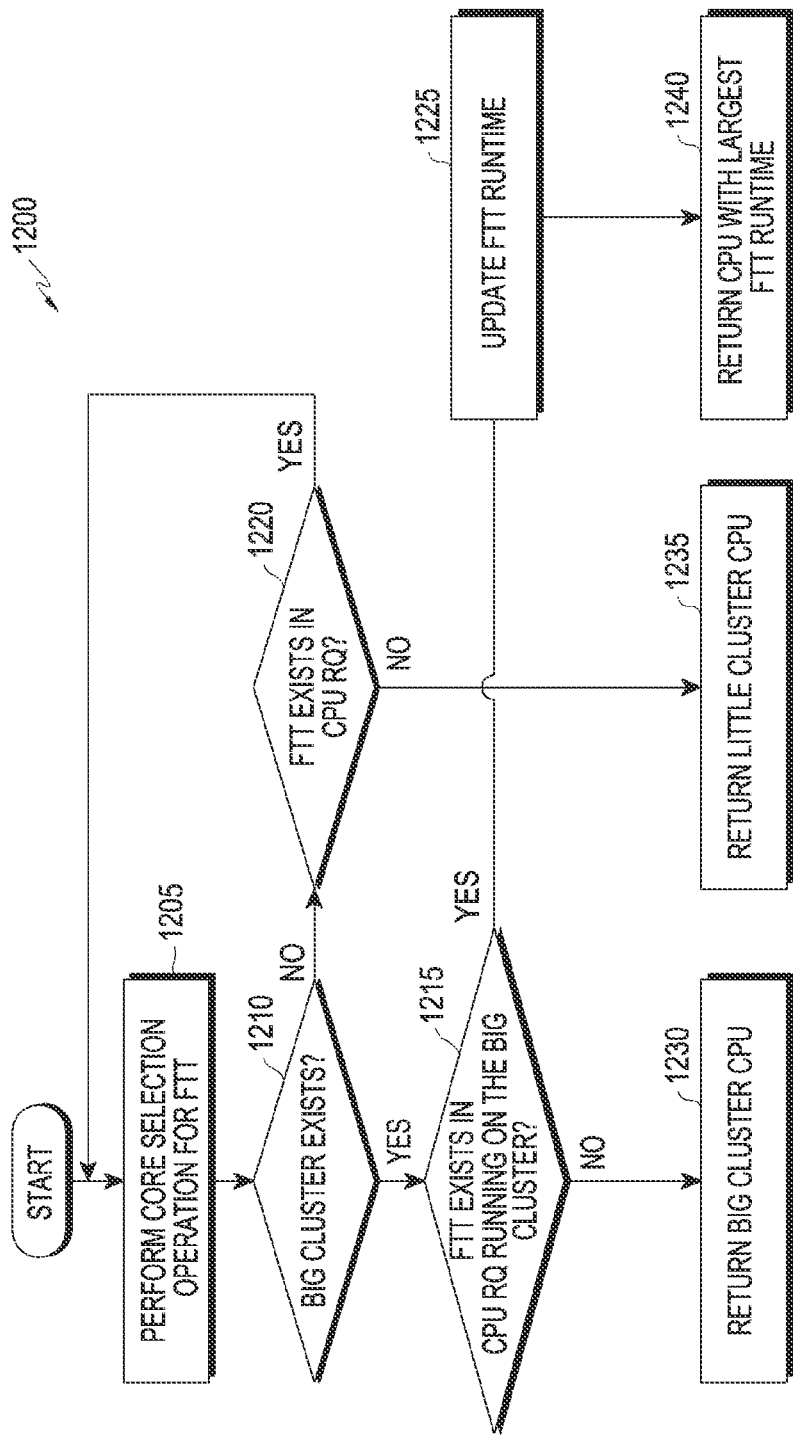
FIG. 12 is a flowchart illustrating a core selection process in a multi-core environment according to an embodiment.

FIG. 12 is a flowchart 1200 illustrating a core selection process in a multi-core environment according to an embodiment.

When two or more tasks correspond to FTTs, that is, two or more FTTs are set in relation to application entry, a contention situation requiring comparison between the FTTs may be generated as described with reference to FIG. 6. Therefore, when the two or more FTTs are distributed to and run on different cores instead of the same core in a multi-core environment, faster application entry than when processing the two or more FTTs on the same core may be expected.

FIG. 12 illustrates a core selection process in a multi-core environment. The process of allocating a core on which an FTT is to be run in a multi-core environment in which a plurality of cores have different driving speeds is described below.

Referring to FIG. 12, setting an FTT for each core of at least one process may be performed by a scheduler.

When an application is run upon a user request or according to a preset schedule, at least one task related to application entry may be set as an FTT in response to a scheduling event occurring along with the execution of the application, and then allocated to a core based on a scheduling policy. For example, in the method of allocating a core on which an FTT is to be run, an operation of allocating a single core to one FTT but allocating cores to run from among a plurality of cores to a plurality of FTTs should be performed.

Accordingly, the scheduler 425 may select a core for an FTT in step 1205. In step 1210, the scheduler 425 may determine (or identify) whether there is a big cluster, that is, a high-performance core (CPU) for an FTT.

For example, four cores out of eight cores (for eight CPUs) may be big clusters and the other four cores may be little clusters. A big cluster may be a high-performance core with a high speed, although it may emit a substantial amount of heat. Therefore, an FTT may be allocated first to a high-performance core, for rapid entry to an application.

When determining that there is a big cluster for the FTT in step 1210, the scheduler 425 may identify whether there is an FTT in a CPU RQ running on the big cluster in step 1215. For example, when another FTT has already been allocated to the big cluster, that is, the high-performance CPU, the high-performance CPU may have to run the already allocated FTT. Accordingly, in the absence of any other FTT in the CPU RQ, that is, in the absence of any other FTT which is running in step 1215, the scheduler 425 may return the CPU of the big cluster first in order to allocate the FTT to the high-performance CPU in step 1230. That is, the FTT may be allocated to the high-performance CPU to run on the high-performance CPU.

On the contrary, in the absence of any big cluster for the FTT in step 1210, the scheduler 425 may identify whether there is an FTT in the CPU RQ in step 1220. When no FTT is in the CPU RQ, such as when there is no CPU running an FTT, the scheduler 425 may return the CPU of a little cluster in step 1235. For example, when all of the CPUs of the big clusters are running FTTs and there is any CPU of a little cluster to which no FTT has been allocated and thus which is not running an FTT, the CPU of the little cluster may be returned to allocate the FTT to the CPU of the little cluster.

When a big cluster exists but has an FTT in the CPU RQ, that is, there are two or more FTTs in step 1215, FTT runtimes may be updated in step 1225. The FTT runtimes are updated to detect a CPU which has run most FTTs, with all of CPUs running.

Subsequently, the scheduler 425 may return a CPU having a largest FTT runtime based on the updated FTT runtimes in step 1240. For example, the CPU which has run most FTTs among the clusters which are running (for example, performance clusters) may be a CPU capable of performing FTT preemption immediately. Therefore, the CPU having the largest FTT runtime may be returned to run the FTT.

When no CPU to which the FTT is to be allocated is detected among all of the big clusters and the little clusters, the scheduler 425 may return a previous CPU.

Because a task set as an FTT should operate with a minimal delay, the FTT should operate mainly on a running cluster (for example, performance cluster). For this purpose, the FTT may not be allowed to operate on the CPU of a little cluster by a CFS balancing operation such as load balancing and idle balancing.

To operate the task as an FTT without delay in the CFS RQ, the task may be processed as exceptional to avoid preemption from a non-FTT task, and a CFS task set as an FTT may be processed as exceptional to always preempt a non-FTT task.

FIG. 13 is a table 1300 listing percentage entry speed increases in adaptive scheduling, when an application is run according to an embodiment.

In FIG. 13, the table illustrates increased application entry speeds achieved by adjusting the virtual runtime of a task set as an FTT among tasks related to application entry or setting and processing an FTT in a binder call or a lock situation in a CFS, when an application is run.

As illustrated in FIG. 13, the measurements of application entry times in a load-free situation and a 50% load situation for various application types are compared between a base case and an FTT-applied case, and the resulting percentage speed increases are shown. As noted from FIG. 13, when an FTT is applied, entry times have been shortened for all applications. It may also be noted that entry times have been shortened even though measurements are performed separately in the load-free situation and the 50% load situation in the FTT-applied case.

As indicated in FIG. 13, as at least one task related to application entry is set as an FTT and the virtual runtime of the FTT is minimized, overall system efficiency may be increased without adversely affecting an RT operation. Therefore, a user may experience improved performance due to the shortened application entry time.

As is apparent from the foregoing description, the CPU runtime of at least one of tasks related to application entry is set to a minimum value during an application entry period. Therefore, there is no adverse effect on operations of tasks to which priorities have been assigned, and adaptive scheduling is possible, relative to a prioritization method.

At least one task with a minimum CPU runtime is run with priority during an application entry period. The resulting rapid application entry may increase an entry speed and shorten a user-experienced entry time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A non-transitory storage medium stores instructions configured to enable the at least one processor to perform at least one operation. The at least one operation may include, in response to running of an application, identifying a plurality of tasks related to a running operation of an application, allocating virtual runtimes to the plurality of tasks when scheduling, adjusting the virtual runtime of at least one task to be run with priority among the plurality of tasks to be a minimum value, arranging the at least one task with the adjusted virtual runtime, and running the at least one task with priority according to an arrangement order.

Embodiments of the disclosure in the present specification and drawings are provided only to present examples in order to easily explain the technical concept according to the embodiments of the disclosure and to help understanding of the embodiments of the disclosure, not intended to limit the scope of the embodiments of the disclosure. Therefore, all modifications or changes derived from the technical spirit of the various embodiments of the disclosure should be interpreted as embraced therein.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device comprising:
   at least one processor; and
   memory for storing instructions that, when executed by the at least one processor, cause
   the electronic device to:
   identify, in response to running of an application, a plurality of tasks related to a running operation of the application;
   allocate virtual runtimes to the plurality of tasks when scheduling;
   adjust the virtual runtime of at least one task among the plurality of tasks to be run with priority to be a minimum value, the at least one task being a main thread of the application;
   arrange the at least one task with the adjusted virtual runtime; and
   run the at least one task with priority according to an arrangement order.

2. The electronic device of claim 1, wherein the instructions, when executed by the at least one processor, further cause the electronic device to:
   set a minimum virtual runtime when performing the scheduling; and
   adjust the virtual runtime of the at least one task to be run with priority to be less than the minimum virtual runtime.

3. The electronic device of claim 1, wherein the instructions, when executed by the at least one processor, further cause the electronic device to identify the at least one task to be run with priority by using process identifiers (PIDs) of the plurality of tasks.

4. The electronic device of claim 1, wherein the at least one task to be run with priority is related to a binder call.

5. The electronic device of claim 1, wherein the instructions, when executed by the at least one processor, further cause the electronic device to arrange the at least one task to be run with priority based on a red-black (RB) tree structure.

6. The electronic device of claim 5, wherein the at least one task to be run with priority is allocated to a leftmost node in the RB tree.

7. The electronic device of claim 5, wherein the instructions, when executed by the at least one processor, further cause the electronic device to, when two or more of the plurality of tasks are to be run with priority, compare the virtual runtimes of the two or more tasks and allocate a task having a minimum virtual runtime to the leftmost node of the RB tree.

8. The electronic device of claim 1, wherein the plurality of tasks are scheduled by a complete fair scheduler (CFS).

9. A method of performing task scheduling, when an application is run in an electronic device, the method comprising:
- identifying, in response to running of an application, a plurality of tasks related to a running operation of an application;
- allocating virtual runtimes to the plurality of tasks, when scheduling;
- adjusting the virtual runtime of at least one task among the plurality of tasks to be run with priority to be a minimum value, the at least one task being a main thread of the application;
- arranging the at least one task with the adjusted virtual runtime; and
- running the at least one task with priority according to an arrangement order.

10. The method of claim 9, wherein adjusting the virtual runtime of at least one task to be run with priority to be the minimum value comprises:
- setting a minimum virtual runtime, when performing the scheduling; and
- adjusting the virtual runtime of the at least one task to be run with priority to be less than the minimum virtual runtime.

11. The method of claim 9, wherein identifying the plurality of tasks related to the running operation of an application comprises identifying the at least one task to be run with priority by using process identifiers (PIDs) of the plurality of tasks.

12. The method of claim 9, wherein the at least one task to be run with priority is related to a binder call.

13. The method of claim 9, wherein the arrangement comprises arranging the at least one task to be run with priority based on a red-black (RB) tree structure.

14. The method of claim 13, wherein the at least one task to be run with priority is allocated to a leftmost node in the RB tree.

15. The method of claim 13, further comprising:
- when two or more of the plurality of tasks are to be run with priority, comparing the virtual runtimes of the two or more tasks; and
- allocating a task having a minimum virtual runtime to the leftmost node of the RB tree.

16. The method of claim 9, wherein the plurality of tasks are scheduled by a complete fair scheduler (CFS).

17. A non-transitory storage medium storing instructions which, when executed by at least one processor of an electronic device, cause the electronic device to perform at least one operation,
wherein the at least one operation comprises:
- identifying, in response to running of an application, a plurality of tasks related to a running operation of an application;
- allocating virtual runtimes to the plurality of tasks, when scheduling;
- adjusting the virtual runtime of at least one task among the plurality of tasks to be run with priority to be a minimum value, the at least one task being a main thread of the application;
- arranging the at least one task with the adjusted virtual runtime; and
- running the at least one task with priority according to an arrangement order.

18. The non-transitory storage medium of claim 17, wherein adjusting the virtual runtime of at least one task to be run with priority to the minimum value comprises:
- setting a minimum virtual runtime, when performing the scheduling; and
- adjusting the virtual runtime of the at least one task to be run with priority to be less than the minimum virtual runtime.

* * * * *